United States Patent [19]

Bordner

[11] 4,322,773

[45] Mar. 30, 1982

[54] TELEPHONE CIRCUIT PROTECTOR APPARATUS

[76] Inventor: Mauri L. Bordner, Rte. 3, Box 28, Pierceton, Ind. 46562

[21] Appl. No.: 109,852

[22] Filed: Jan. 7, 1980

[51] Int. Cl.³ .................................................. H02H 3/22
[52] U.S. Cl. ...................................... 361/119; 174/51; 174/58
[58] Field of Search ............... 361/117, 118, 119, 129; 174/51, 58, 52 R, 53, 61, 64; 248/226.5; 339/13, 14 R, 95 R

[56] References Cited

U.S. PATENT DOCUMENTS 3,594,682  7/1971  Oleson .......................... 339/95 R X
3,868,080  2/1975  Olson .............................. 174/58 X Primary Examiner—Harry E. Moose, Jr.
Attorney, Agent, or Firm—Woodard, Weikart, Emhardt & Naughton

[57] ABSTRACT

Telephone circuit protector apparatus which can be easily installed on a power conduit in one, simple, snap-on motion with the ground terminal of the apparatus automatically being electrically connected to the power conduit, thus providing a power ground.

10 Claims, 6 Drawing Figures

TELEPHONE CIRCUIT PROTECTOR APPARATUS

BACKGROUND OF THE INVENTION

1. Field of the Invention

The field of the invention relates to telephone circuit protector boxes and their installation.

2. Description of the Prior Art

Telephone circuitry is susceptible to damage caused by high power voltage surges which, for example, might result from lightening striking exposed telephone lines. To protect against such damage, it is standard practice to install a telephone circuit protector on the incoming line into a building. Such a protector might have, for example, two lead terminals, a circuit protector, and a ground terminal. The lead terminals connect with the drop line, and with the telephone circuitry in the interior of the building. Connecting between the lead terminals is a circuit protector, which is sensitive to high voltage surges. Upon the occurrence of such a surge, the circuit protector changes into a conductive state, shunting the excess current to the ground terminal.

Typically, telephone circuit protector boxes are installed on the exterior of the building. The box is attached to the building by drilling holes into an exterior wall of the building, and by then bolting the box to the wall. Electrical ground is obtained by leading a wire from the ground terminal of the box to an appropriate ground location, such as a water pipe. This procedure is time consuming. Also, the drilling tends to cause damage to the exterior wall of the building and leaves unsightly holes if the protector box is later removed.

SUMMARY OF THE INVENTION

In general terms, the present invention relates to the quick, convenient installation of telephone circuit protectors. In one embodiment, a telephone circuit protector box can be easily installed on a power conduit in one, simple, snap-on motion with the ground terminal of the apparatus automatically being electrically connected to the power conduit, thus providing a power ground. The present invention provides significant advantages in time saving and in efficiency. Other objects and advantages will become apparent in the following detailed description.

DESCRIPTION OF THE PREFERRED EMBODIMENT

Figure 1:
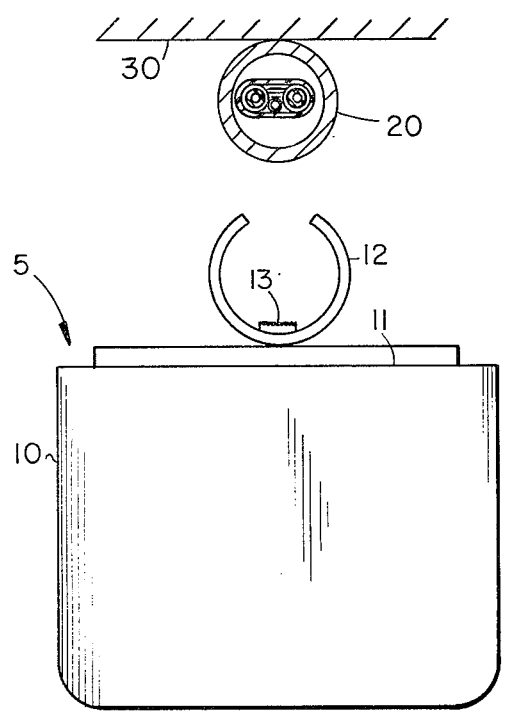
FIG. 1 is a top plan view of a telephone circuit protector of the present invention in a position for installation on a power conduit.

For the puroses of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, it can be seen that tubular member 12 is mounted to the back 11 of box 10 by means of bolts 13 and 13A. Tubular member 12 is made of resilient material and is adaptable to receive through an axial slot a power conduit 20, which is mounted on the exterior of building 30. As telephone protector apparatus 5 is pushed onto power conduit 20 through its axial slot, tubular member 12 expands to receive power conduit 20. When installation is completed, tubular member 12 is disposed rigidly about power conduit 20, maintaining telephone circuit protector apparatus 5 rigidly in position. In this manner, it is seen that telephone circuit protector apparatus 5 can be easily mounted by a simple push-on, or snap-on motion. Telephone circuit protector apparatus 5 is shon in an installed position on power conduit 20 in FIG. 2.

Figure 4:
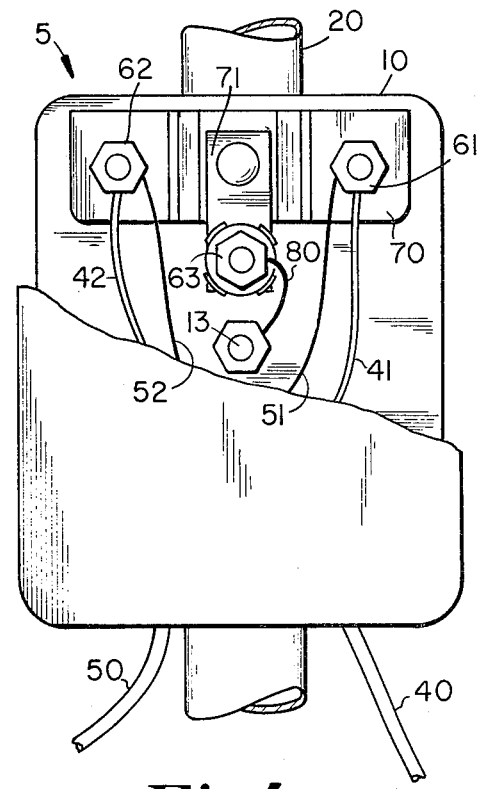
FIG. 4 is a front elevational, partial fragmentary view of a telephone circuit protector of the present invention installed on a power conduit.

FIG. 4 illustrates a completely installed telephone circuit protector apparatus 5, with a cut away portion showing internal components within protector box 10 and the manner in which the telephone lines are connected within the box. Drop line 40 enters box 10 through an aperture (not shown) at the bottom of the box. Drop line 40 contains line 41, which is connected to lead terminal 61, and line 42 which is connected to lead terminal 62. Line 50 connects with the telephone circuitry in the interior of building 30, and also enters protector box 10 through an aperture at the bottom of the box. Line 50 contains wire 51 which connects with wire 41 at terminal 61, and wire 52 which connects with wire 42 at terminal 62.

Circuit protector 70 connects between terminals 61 and 62, and is sensitive to high voltage surges. In TII Ind. Inc. signal circuit protector model 300B, for example, circuit protector 70 contains a gas which ionizes upon the application of a high voltage. Upon ionization, the gas solidifies to change into a conductive state. In this manner, circuit protector 70 conductively leads the voltage surge to ground terminal 63 through plate 71.

Figure 2:
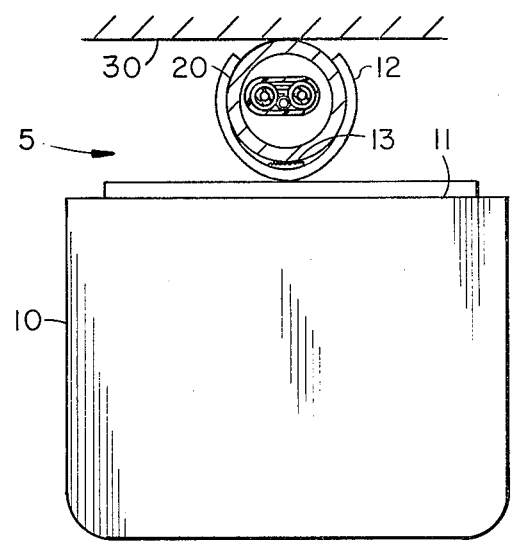
FIG. 2 is a top plan view of a telephone circuit protector of the present invention installed on a power conduit.
Figure 3:
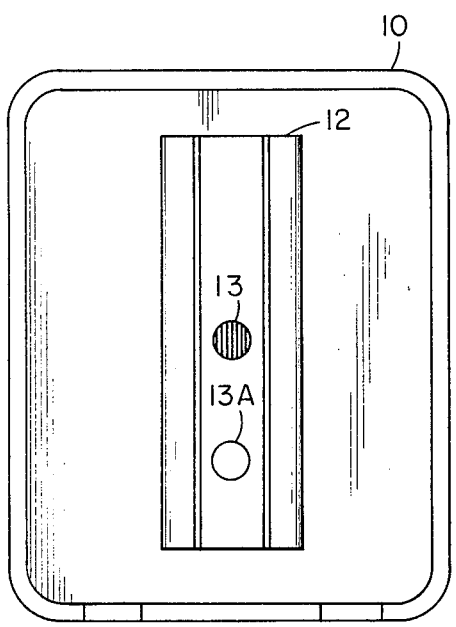
FIG. 3 is a back elevational view of a telephone circuit protector of the present invention.

Ground terminal 63 is connected to electrically conductive bolt 13 through wire 80. As is seen in FIGS. 1, 2 and 3, bolt 13 has a serated surface at its head, and as is clearly seen in FIG. 2, this serated edge makes contact with power conduit 20 when telephone circuit protector apparatus 5 is installed to ensure a good electrical contact. Because the exterior of power conduit 20 is electrically grounded, telephone circuit protector apparatus 5 is thus provided with an electrical ground.

It is clear that the above described telephone circuit protector apparatus presents considerable advantages. Because the protector can be mounted in one, simple, snap-on motion, installation time is significantly diminished. It makes unnecessary the drilling into the exterior wall of the building, which may cause damage and which leaves unsightly holes if the protector box is later removed. Further, the mere mounting of the protector box automatically ensures an electrical ground through the power conduit, thus it is no longer necessary to make an additional ground connection.

Figure 5:
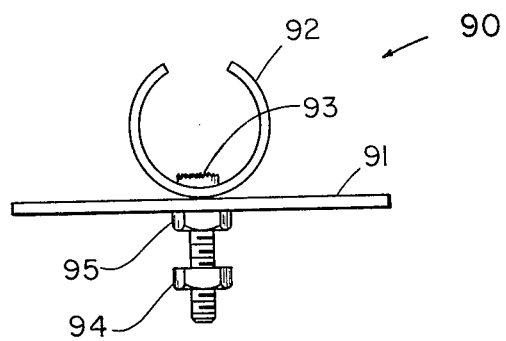
FIG. 5 is a top plan view of an adaptor for use in mounting a telephone circuit protector of the prior art.
Figure 6:
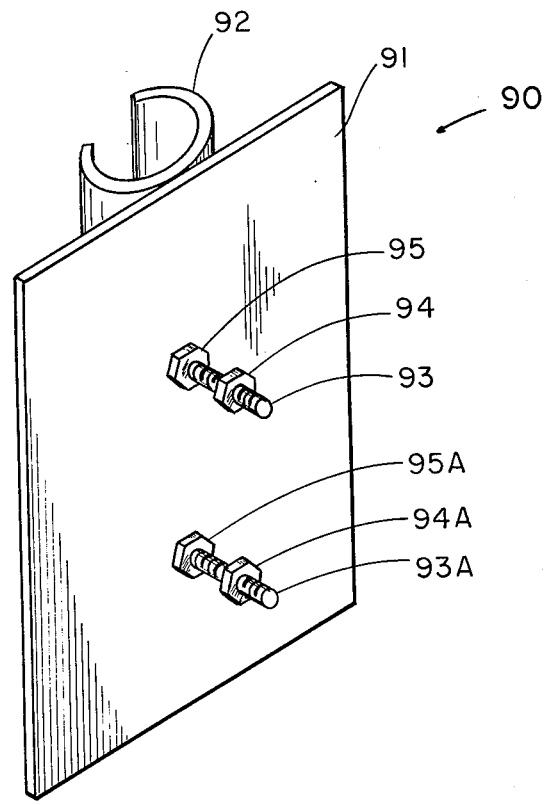
FIG. 6 is a perspective view of the adaptor of FIG. 5.

Tubular member 12 may either be separately constructed, or may be incorporated with protector box 10 in a molded construction. FIGS. 5 and 6 illustrate an adaptor which is useful, in accordance with the present invention, in mounting a telephone circuit protector of the prior art to a power conduit. Adapter 90 includes a tubular member 92 which may be attached to a telephone circuit protector by means of bolts 93 and 93A and nuts 95 and 95A. Mounting plate 91 acts to stabilize the attachment to the back of the protector box. When adaptor 90 is attached to a protector box, nuts 94 and 95 and nuts 94A and 95A are located within the box. A wire connection may then be made from the ground terminal of the protector to bolt 93 with nut 94 being tightened toward nut 95 to maintain the connection. Alternatively, the ground connection may be made with bolt 93A. Both bolts 93 and 93A are made of electrically conductive material and have serrated heads to ensure a good electrical connection with a power conduit.

It should be noted that the actual size of tubular member 12 may be selected to match the particular size of the power conduit on which the telephone circuit protector apparatus is to be mounted. Further, although a tubular shape for the mounting means is preferred because of the soundness of the resulting attachment with the power conduit, other specific means of mounting the protector box to the power conduit may be incorporated and still fall within the spirit of the invention.

Therefore, while there have been described above the principles of this invention in connection with specific apparatus and techniques, it is to be clearly understood that this description is made only by way of example and not as a limitation to the scope of the invention.

What is claimed is:

1. Telephone circuit protector apparatus comprising:
   (a) a telephone circuit protector, said protector including a plurality of lead terminals, a ground terminal, and means for conducting a high voltage current applied across said lead terminals to said ground terminal;
   (b) mounting means for mounting said protector, said means including a tubular member of resilient material having an axial slot, said tubular member being attached to said protector and being adapted to rigidly receive through said axial slot a cylinder of approximately the same diameter as the inside diameter of said tubular member; and
   (c) grounding means for electrically connecting said ground terminal to the interior of said tubular member.

2. The apparatus of claim 1 in which said grounding means includes an electrically conductive bolt which attaches said mounting means to said telephone circuit protector.

3. The apparatus of claim 2 in which said bolt has a serrated head which is disposed within said tubular member.

4. The combination of:
   (a) a telephone circuit protector, said protector including a plurality of lead terminals, a ground terminal, and means for conducting a high voltage current applied across said lead terminals to said ground terminal;
   (b) a power conduit having an exterior surface of electrically conductive material that is electrically grounded;
   (c) mounting means for mounting said telephone circuit protector to said power conduit with a snap-on fit; and
   (d) grounding means for electrically connecting said ground terminal through said mountng means to the exterior surface of said power conduit.

5. The combination of claim 4 in which said power conduit is cylindrical in shape, and in which said mounting means includes two flexible prong members projecting from said protector, said members defining a slot and being adapted to rigidly receive said power conduit through said slot.

6. The combination of claim 4 in which said power conduit is cylindrical in shape, and in which said mounting means includes a tubular member of resilient material, said tubular member having an axial slot and being adapted to rigidly receive said power conduit through said axial slot.

7. The combination of claim 6 in which said grounding means includes an electrically conductive bolt which attaches said tubular member to said telephone circuit protector, said bolt having a serrated head which is disposed within said tubular member.

8. The apparatus of claim 1 in which said grounding means includes an electrically conductive member which passes from said telephone circuit protector and through said mounting means into the interior of said tubular member.

9. The combination of claim 4 in which said grounding means includes said mounting means.

10. The combination of claim 9 in which said grounding means includes an electrically conductive member which passes from said ground terminal in said telephone circuit protector and through said tubular member of said mounting means and electrically connects to the exterior surface of said power conduit.

* * * * *